United States Patent

Tåquist et al.

[11] Patent Number: 5,685,674
[45] Date of Patent: Nov. 11, 1997

[54] METHOD OF MACHINING COMPOSITES

[75] Inventors: Lennart Tåquist, Sandviken; Uno Bäckman, Tullinge, both of Sweden

[73] Assignee: Sandvik AB, Sandviken, Sweden

[21] Appl. No.: 549,216

[22] Filed: Oct. 27, 1995

[30] Foreign Application Priority Data

Oct. 28, 1994 [SE] Sweden .................. 9403716

[51] Int. Cl.$^6$ .................. B23C 3/00; B23B 35/00
[52] U.S. Cl. .................. 409/132; 408/1 R
[58] Field of Search .................. 409/131, 132; 408/1 R, 230, 144, 145, 212

[56] References Cited

U.S. PATENT DOCUMENTS

| | | | |
|---|---|---|---|
| 3,443,459 | 5/1969 | Mackey et al. | |
| 4,190,386 | 2/1980 | Brabetz et al. | 408/1 R |
| 4,222,690 | 9/1980 | Hosoi et al. | 408/230 |
| 4,231,692 | 11/1980 | Brabetz | 408/230 |
| 4,338,050 | 7/1982 | Ozer et al. | 408/1 R |
| 4,480,949 | 11/1984 | Van De Bogart | 408/230 X |
| 4,529,341 | 7/1985 | Greene | 408/212 |
| 4,679,971 | 7/1987 | Maier | 408/145 |
| 4,757,645 | 7/1988 | Ozer et al. | |
| 4,991,467 | 2/1991 | Packer | 76/108.6 |
| 5,115,697 | 5/1992 | Rodriguez et al. | 76/108.6 |
| 5,137,398 | 8/1992 | Omori et al. | 408/145 |
| 5,217,332 | 6/1993 | Takasaki et al. | 408/145 |
| 5,273,379 | 12/1993 | Nishimura | 408/144 |

FOREIGN PATENT DOCUMENTS

| | | |
|---|---|---|
| 173899 | 1/1961 | Sweden . |
| 382506 | 12/1970 | Sweden . |
| 2048135 | 4/1980 | United Kingdom . |
| 93/23192 | 5/1993 | WIPO . |
| 94/11142 | 11/1993 | WIPO . |

*Primary Examiner*—William R. Briggs
*Attorney, Agent, or Firm*—Burns, Doane, Swecker & Mathis, L.L.P.

[57] ABSTRACT

There is disclosed a method of producing holes or recesses in a workpiece of fiber reinforced materials using a rotary tool, preferably a rotary end mill, comprising a rear shaft portion and an integral forward cutting portion having a central axis. The cutting portion is a sintered body having at least a pair of longitudinally extending flutes and a corresponding pair of cutting edges made of diamond or cubic boron nitride at the circumference adjacent each flute so as to define the diameter of said tool. The tool is rotated about an axis and fed along said axis until the initial penetration of the tool is made whereby the tool supported after the initial penetration so that its central axis rotates eccentrically to the feed axis of the tool by a distance sufficient to drill a hole of a desired diameter greater than the diameter of the tool. The tool is fed in said direction until the hole has been completed.

5 Claims, 1 Drawing Sheet

METHOD OF MACHINING COMPOSITES

BACKGROUND OF THE INVENTION

The present invention relates to a method for producing holes or recesses in a workpiece of a fiber reinforced composite material.

A composite material results when two or more materials, each having its own, usually different characteristics, are combined in order to provide the composite with useful properties for specific applications. Each of the input materials serve a specific function in the composite, which in turn show distinctive new or improved characteristics.

Composite materials are well known in the art. They are applied to a growing number of products such as fishing poles, lightweight automobiles or aircraft, machine tool bits and thermal protection systems for reentry from space.

Composite materials are rapidly emerging as the primary material for use in aircraft systems because they provide greater structural efficiency at lower weights than equivalent metallic structures. Said composites generally are composed of basically two different materials, fibers and matrix, which are combined and subsequently bonded under heat and pressure to achieve the properties of high strength and stiffness with low density. On a specific basis, all the advanced composite materials are much stronger and stiffer than steel or aluminum. Other significant advantages of advanced composites are their resistance to fatigue and corrosion and their tendency to dampen vibrations more rapidly than less stiff materials.

The matrix material can be epoxies, polyesters, or polyamides, which usually cure (harden) in the presence of a catalyst, heat or pressure. They can also be polycarbonates or polysulfones that are also cured in the presence of heat and pressure but can be softened and reshaped by heat. However, epoxies are the matrix materials most commonly used for advanced composites. High-performance fibers available for such applications are boron, graphite and the Aramid fiber known as Kevlar.

Products consisting of composite material are often constructed from components joined together by adhesive means or by bolts or rivets to produce a finished product. For that reason, hole generation, particularly bolt holes, is a major activity in the manufacture of structural assemblies in, e.g., the aircraft industry. The strength of a bolted or riveted connection is influenced to a considerable degree by the quality and precision of the hole.

The methods used to produce holes in composite laminates are the traditional solid tool methods of boring, milling, sawing and grinding. Also, newer machining methods such as water-jet and laser cutting are being used. The problem associated with these hole-forming methods as they are applied at the present time is that they are not sufficiently effective for various reasons from a technical/economic point of view.

Swedish Patent Application 9201420-8 discloses a method of machining and shaping a through opening in a fiber reinforced composite material starting from a preformed hole. At least one rotation symmetrical grinding body with a substantially smaller diameter than that of the preformed hole is placed in the preformed hole and the opening is machined and shaped by the grinding body partly rotating around its own axis, partly performing a translational movement relative to the edge of the opening. According to the method, the fiber reinforced material is oriented in such a way that the axis of rotation of the grinding body is essentially perpendicular to the longitudinal direction of the fibers at the edge of the opening. The size and/or form of the finished opening differs significantly from that of the preformed hole. The radial spread of the damages and/or the defects define a lower limit for the amount of material removed.

U.S. patent application Ser. Nos. 08/428,702 and 08/419,288 (our references: 024000-937 and 024444-125) incorporated by reference herein, disclose the use of a milling body instead of a grinding body resulting in significantly higher rate of cutting, less heat generation as well as better machining economy.

SE 173 899 discloses a machine tool having a tool carrier rotating eccentrically about a principal axis, in which the distance between the tool carrier and the principal axis is adjustable. SE 382 506 discloses a rotatably driven, combined cutting tool for making holes in stationary workpieces, which holes can be provided with a conical starting chamfer.

Further examples of the prior art are found in U.S. Pat. No. 4,190,386, U.S. Pat. No. 4,338,050 and U.S. Pat. No. 4,757,645, which describe methods of producing holes in composite materials. GB 2 048 135 discloses a method of machining a pre-formed hole to the desired size/geometry.

WO 94/11142 discloses a method in which at least one cutting tool is positioned eccentrically in relation to a central axis. Material is machined simultaneously in both an axial and a radial sense by causing the tool to describe an axial motion and to rotate not only about its own axis, but also eccentrically about the central axis. In accordance with particular characterizing features of the invention, the removal of material by cutting takes place using alternatively grinding, milling and boring tools or combinations thereof.

OBJECTS AND SUMMARY OF THE INVENTION

It is an object of this invention to avoid or alleviate the problems of the prior art.

A primary object of the invention is to utilize a rotary tool for making holes or recesses in a fiber reinforced workpiece material with an increased lifetime due to its increased wear resistance which makes it possible to eliminate the need of performing a whole series of machining operations until a final hole or recess is made.

Another object is to define a method that makes it possible to eliminate those defects that usually are found around holes made in such fiber reinforced materials.

The presently claimed the invention provides a method of producing holes or recesses in a workpiece of fiber reinforced material comprising the steps of: providing a rotary tool having a rear shaft portion and an integral forward cutting portion having a central axis, said cutting portion being a sintered body having at least a pair of longitudinally extending flutes and a corresponding pair of cutting edges made of diamond or cubic boron nitride at the circumference adjacent each flute so as to define the diameter of said tool; rotating said tool about an axis; feeding said tool along said axis until the initial penetration of said tool is made; supporting said tool after said initial penetration so that its central axis rotates eccentrically to said feed axis of said tool by a distance sufficient to drill a hole of a desired diameter greater than the diameter of said tool; and feeding said tool in said direction until the hole has been completed.

DETAILED DESCRIPTION OF THE PREFERRED EMBODIMENTS OF THE INVENTION

It has now surprisingly been found that holes of acceptable quality can be produced in fiber reinforced materials by the use of a rotary tool, suitably a drilling end mill, comprising a tool body having a rear shaft portion and an integral forward cutting portion. The cutting portion comprises at least a pair of longitudinally extending flutes and longitudinally extending edge portions of diamond or cubic boron nitride at the circumference adjacent each flute. The tool is rotated about an axis and fed along said axis into penetration of a hole in said workpiece. The tool is supported so that it rotates under axial movement until hole penetration has been completed. The making of holes with diameters greater than the diameter of such end mill is performed by positioning the tool eccentrically in relation to the tool axis, after said first penetration, and machining the workpiece material simultaneously in both an axial and a radial direction by causing the tool to describe an axial motion and to rotate not only about its own axis but also eccentrically about said axis. The rotary motion is executed with a constant distance between the central axis and the axis of rotation of said tool. Preferably, said tool is provided in the shape of a twisted drill in which the twisted cutting edges are interconnected with a portion of diamond or cubic boron nitride that extends completely across the apex of the forward cutting end of said drill.

In an alternative embodiment, the tool is provided with a forward cutting portion that extends beyond the forward end of the end mill. Said forward cutting portion comprises a cutting edge that starts adjacent the longitudinal axis of said tool and extends radially outwardly along a line which curves outwardly.

In yet another alternative embodiment, the tool is provided with a forward cutting portion composed of two cutting edges that start at a center of rotation and extend symmetrically and are curved outwardly away from the direction of rotation. Each said edge is formed with a rake angle which is approximately zero at the radial inner portion of said rake face.

Preferably the direction of the feed of said tool is perpendicular to the direction of the fibers of said workpiece material.

Figure 1:
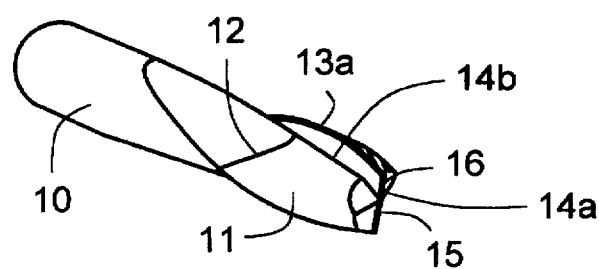
FIG. 1 shows a perspective view of a drilling end mill suitable for being used in carrying out the method of machining pursuant to the invention.

The tool shown in FIG. 1 is a drilling end mill that comprises a rear cylindrical shaft portion 10 and a forward blade portion 11 brazed together along the junction at 12. The shaft portion can be made of hard metal or high speed steel whereas the blade portion should be made of sintered base material, typically cemented carbide, which in this case possesses two twisted edges 13a and 13b and two spiral twisted flutes 14a and 14b therebetween. The end of this tool is shaped like a milling cutter with end cutting edges 15 and 16 extending perpendicular in relation to a plane through the central axis of said tool or tapered inwardly. A sintered polycrystalline diamond or cubic boron nitride material has been pressed in the helical grooves and in diametrically provided grooves across the end of the tool of the cemented carbide blank in connection with the manufacture after which the helically extending edges 13a, 13b and straight edges 15, 16 have been produced by grinding.

Figure 2:
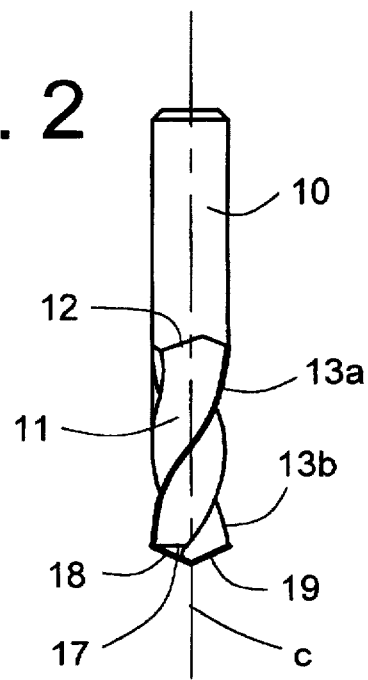
FIG. 2 shows another type of rotary tool, a drill, suitable for being used in carrying out the method of the invention.
Figure 3:
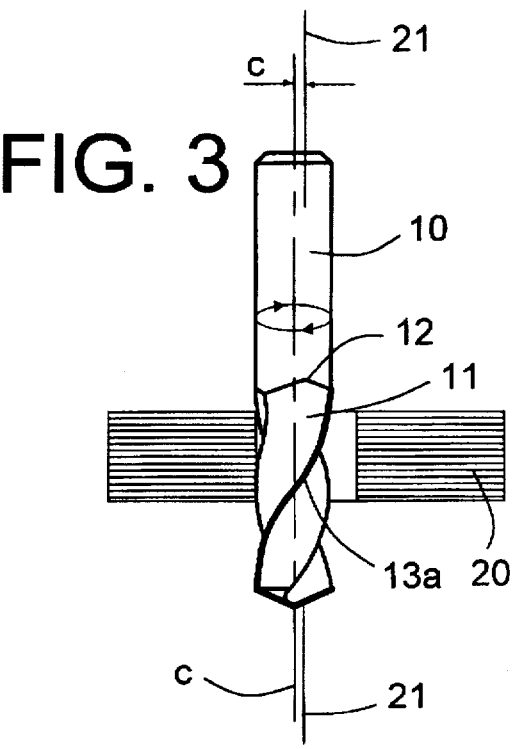
FIG. 3 shows a view showing how a hole is being formed in a workpiece by using the tool shown in FIG. 2.
Figure 4:
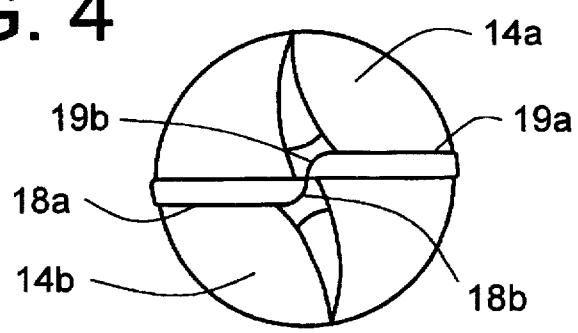
FIG. 4 shows a front view of the tool in FIG. 2.

The rotary drill shown in FIGS. 2 and 3, comprises a cemented carbide blade part 11 having two symmetrically twisted flutes and two corresponding twisted edges 13a and 13b made of a sintered compact of high hardness and high wear resistance that are filled into corresponding longitudinally extending grooves in the outside surface of blade portion 11. Said edges have been formed by grinding said sintered compact along a leading edge of said sintered compact. The forward apex of the drill has been provided by a conically extending cutting portion 17 made of polycrystalline diamond or cubic boron nitride-like sintered compacts 13a and 13b made similarly to the tool in FIG. 1. The more peripherally located cutting edge comprises two straight cutting edges 18a, 19a that extend to curved edges 18b, 19b which start from the center axis of the drill and follow a curved line from said center outwardly towards the periphery. The steel shank 10 and the carbide blade part 11 are joined at the junction 12.

The rake face of the radially innermost portion of said curved edge material portions 18b, 19b is approximately oriented at a zero degree rake angle.

FIG. 3 shows the hole penetration of a workpiece 20 of fiber reinforced material wherein after the initial hole penetration of the workpiece 20, the drill is fed axially in the direction of its central axis C which is offset from the central axis 21 of the hole to be drilled. The axis of the drill is oriented perpendicularly in relation to the direction of the fibers of said workpiece 20. The drill is then supported after said initial penetration such that it rotates eccentrically to said feed axis by a distance sufficient to drill a hole of a desired diameter greater than the diameter of said drill. Although shown in FIG. 3 making a through hole, the presently claimed invention can also be used to make recesses in fiber reinforced materials.

The presently claimed invention has been described with reference to producing holes or recesses in a fiber reinforced material. It is, however, obvious for those skilled in the art that the method can be used also for the more general shaping of fiber reinforced materials.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of producing holes or recesses in a workpiece of fiber reinforced material comprising the steps of: providing a rotary tool having a rear shaft portion and an integral forward cutting portion having a central axis, said cutting portion being a sintered body having at least a pair of longitudinally extending flutes and a corresponding pair of cutting edges made of diamond or cubic boron nitride at the circumference adjacent each flute so as to define the diameter of said tool; rotating said tool about an axis; feeding said tool along said axis until the initial penetration of said tool is made; supporting said tool after said initial penetration so that its central axis rotates eccentrically to said feed axis of said tool by a distance sufficient to drill a hole of a desired diameter greater than the diameter of said tool; and feeding said tool in the direction of the feed axis until the hole has been completed wherein the tool is provided with at least a pair of twisted flutes and correspondingly twisted cutting edges, and further wherein said tool is provided with a forward cutting portion composed of two cutting edges starting at a center of rotation and extending symmetrically and curved outwardly away from the direction of rotation, each said edge being formed with a rake angle being approximately zero at the radial inner portion of said rake face.

2. The method of claim 1, wherein said tool is in the shape of a twisted drill in which the twisted cutting edges are interconnected with a portion of diamond or cubic boron nitride that extends completely across the apex of the forward cutting end of said drill.

3. The method of claim 1, wherein said tool is provided with a forward cutting portion that extends beyond the forward end of the rotary tool, said forward cutting portion comprising a cutting edge that starts adjacent the longitudinal axis of said tool and extends radially outwardly along a line which curves outwardly towards the periphery.

4. The method of claim 1, wherein the direction of the feed of said tool is perpendicular to the direction of the fibers of said workpiece material.

5. The method of claim 1, wherein said tool is provided with cutting edges made of diamond or cubic boron nitride which extend in diametrically provided grooves across the end of said tool.

* * * * *